(No Model.)
G. E. SHEA.
COMBINATION TOOL OR HOOK.
No. 466,628. Patented Jan. 5, 1892.
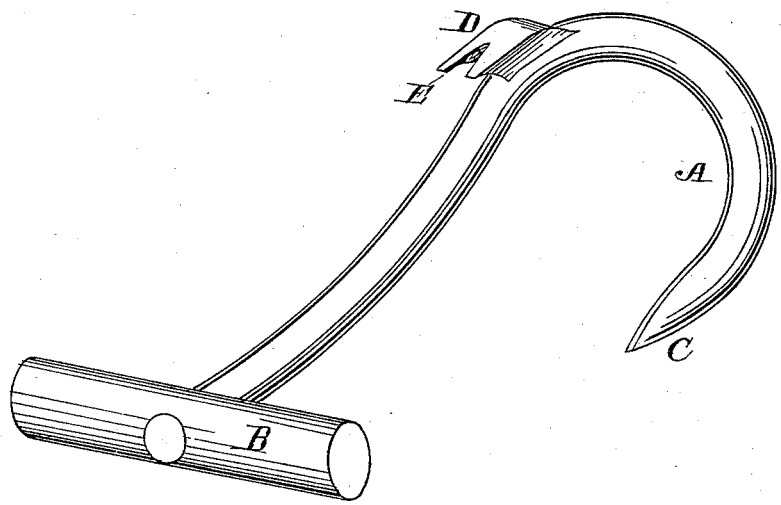
WITNESSES:
INVENTOR
G. E. Shea
BY
ATTORNEY.

UNITED STATES PATENT OFFICE.

GEORGE E. SHEA, OF LONG ISLAND CITY, NEW YORK.

COMBINATION TOOL OR HOOK.

SPECIFICATION forming part of Letters Patent No. 466,628, dated January 5, 1892.

Application filed September 4, 1890. Renewed December 5, 1891. Serial No. 414,136. (No model.)

*To all whom it may concern:*

Be it known that I, GEORGE E. SHEA, a citizen of the United States, and a resident of Long Island City, in the county of Queens and State of New York, have invented certain new and useful Improvements in a Combination Tool or Hook, of which the following is a specification.

The object of my invention is to provide a new and improved tool for handling, opening, and closing boxes, bales, barrels, &c.

The invention consists of a hook having a handle and a hammer-head on the opposite side of the hook, from which head is a nail-claw projecting toward the handle for purposes which will now be set forth in detail.

The drawing is a perspective view showing the manner of constructing the invention.

The hook A has a handle B made in the usual manner on the body of the hook. On the body of the hook, on the opposite side of the point C, I place a poll or head D, having the two points E, which project toward the handle B, thus forming the hammer and claw on the curved portion of the body of the hook.

It is obvious that the hook can be cheaply made and its use as a hook be not impaired by the addition of the hammer-poll and the nail claw, while their presence is of the greatest service at all times.

What I claim as new is—

The herein-described tool, consisting of a handled hook having a combined hammer and nail-claw on the body thereof, substantially as herein set forth.

Signed at Long Island City, in the county of Queens and State of New York, this 25th day of August, A. D. 1890.

GEORGE E. SHEA.

Witnesses:
FRED C. HELLMUTH,
EDGAR SHEA.